Patented Oct. 1, 1935

2,015,912

UNITED STATES PATENT OFFICE 2,015,912

METHOD OF TREATING HIGH MOLECULAR SPLIT-OFF PRODUCTS OF ALBUMIN WITH HIGHER FATTY ACID CHLORIDES, AND PRODUCT OF SAID METHOD

Fritz Sommer, Charlottenburg, near Berlin, Germany, assignor to Chemische Fabrik Grünau Landhoff & Meyer Aktiengesellschaft, Grunau, near Berlin, Germany No Drawing. Application September 7, 1932, Serial No. 632,081. In Germany February 16, 1932

10 Claims. (Cl. 260—9)

This invention relates to certain products which have proven of great value in the useful arts, and a method of preparing the same.

I have found that by treating high molecular split off products of albumin particularly those of the lysalbinic acid and protalbinic acid type, with higher saturated or unsaturated fatty acid chlorides, the products thus obtained possess very valuable characteristics. It will be apparent to those skilled in the art that suitable mixtures of different fatty acids may be used in carrying out my method.

In carrying out my method for the production of the useful products referred to, I may use a liquor such as is obtained in the alkaline or acid decomposition of leather waste such as leather chippings or the like. For carrying out my method, horn, casein, vegetable albumin and gelatine may also be used.

In carrying out my process it is preferable to proceed as follows: The chloride of the fatty acid, or mixture of fatty acids, used is poured into a solution of the albumin decomposition compound while vigorously stirring the mixture, care being taken by the addition of an alkali that the solution shall remain alkaline to the conclusion of the operation. The products thus obtained are either clear oils or pastes in which the nitrogen of the albumin is probably acylized.

The resultant products may be utilized in the form in which they are produced or they may be obtained as dry white products by evaporation, spraying or by any other suitable procedure to that end. The products of the reaction dissolve to a clear solution in water and are characterized by a very high lather forming capacity as well as by their stability in the presence of most of the chemicals with which they are brought in contact when used.

The following are illustrative examples for carrying out my invention:

Example 1

To a solution of eighty parts of commercial lysalbinate of sodium in 400 parts of water there are added 30 parts of oleic chloride, while stirring strongly. Simultaneously a caustic soda solution containing 6 parts of sodium hydroxide will be poured into the solution in such manner that the latter shall always remain alkaline. The reaction will be completed by subsequently heating the mixture to about 60° centigrade. The result is a clear salve-like mass which may be dried if desired.

Example 2

Into 27 parts of a liquor registering 30° Baumé obtained by the disintegrating treatment of leather waste and having a content of 50% of lysalbinic acid and protalbinic acid, there is poured 9 parts of oleic chloride, the mixture being thoroughly mixed, 6.3 parts of caustic soda solution (32.5% by weight) being simultaneously added to keep the mixture always alkaline. By allowing the frothy mass to stand in a moderate heat said mass will be converted into a clear oil which is absolutely stable in the presence of lime.

Example 3

To 27 parts of the liquor obtained by the acid disintegrating treatment of leather waste, there is simultaneously added a mixture of about 6 parts of oleic chloride and the chlorides of solid fatty acids, such as palmitic chloride, and about 4 parts of caustic soda solution of 32.5% by weight. The operation is carried out as in Example No. 2. The oily product obtained is dried in a spraying or atomizing dryer. A light colored powder which is soluble in a clear solution of water will thus be obtained. Solutions of this powder are stable in the presence of lime or acids.

Example 4

81 parts of a liquor obtained by the alkaline disintegrating treatment of chrome leather waste are treated with 18 parts of palmitic and stearic chlorides and about 11.7 parts of an equivalent mixture of caustic soda and caustic potash solution registering about 40° Baumé. The reaction will be completed in about four hours, after which the mixture will be stirred for a while and the salve-like mass will then be cleared by the addition of 2% of ethyl alcohol. A clear yellow oil will thus be obtained which is stable in the presence of alkalies, lime and sulphate of magnesia.

Example 5

Horn parings or chips are treated with lime in the presence of heat. The mixture is then filtered and the superfluous lime is removed by the addition of carbonate of ammonia. By condensing the mixture albumose from horn will be obtained. 17 parts of the latter are then dissolved in 80 parts of water and the solution treated with 12 parts of oleic chloride and so much caustic soda solution that the mixture will always remain alkaline. The reaction will be completed by heating at about 20° centigrade. The operation will be completed by drying on suitable racks within a vacuum drying chamber, whereby 28 parts of a scaly or flaky mass will be obtained.

*Example 6*

Gelatine is soaked in five times its quantity of water and the mixture is heated in autoclaves for a considerable time at a temperature of 100° centigrade. The resultant solution is treated with small quantities of sodium hydroxide or sodium carbonate in order to remove any metallic impurities and then, after filtering, it will be concentrated by evaporation to a gelatose syrup of about 70%. 20 parts of said syrup are diluted with water and then simultaneously treated with 9 parts of a fatty acid chloride and about 4 parts of concentrated caustic soda solution. The temperature will preferably be maintained between 15 and 17 degrees centigrade, the mixture being subsequently heated for about an hour to 70° centigrade. The mass resulting from the reaction is dried on suitable racks.

*Example 7*

Casein is converted into casein albumose by treating with caustic soda solution. 17 parts of the casein albumose thus obtained are diluted with water and then treated with 12 parts of oleic chloride while keeping the mixture always alkaline during the reaction which is effected at room temperature. The reaction will be completed by subsequent heating and the mass obtained from the reaction will be treated as in Example 6.

It will be seen that applicant makes use of acid-chlorides or of corresponding derivatives possessing the required reactivity, as distinguished from chlorinated fatty acids.

The products obtained in accordance with the present invention have proven of great value in the useful arts. They are particularly valuable in the treatment of leather and the products of the textile and spinning industries as well as of other products, as washing, dispersing impregnating and protective compositions, one reason for this being that they possess a very high lather forming, washing, dampening and emulsive capacity, as they readily form soluble salts with the water hardening substances in water. By their use raw wool can be advantageously washed and woolen yarn can be steeped without the formation of greasy lime soaps. They also act favorably in fulling or milling by reason of the great clearness of the colors obtained. In dyeing, the use of these products enables thorough dyeing and equalizing to be done in either an acid or an alkaline dyeing bath.

The products in accordance with my invention are also eminently adapted to the preparation of emulsions, for example with fats or mineral oils. Their stability in the presence of strong alkalies is excellent, whereby said products are pre-eminently useful in mercerizing. Said products may also be utilized in the fur, skin and leather industry. For example in washing, in the preparation of skins by maceration and in bleaching and toning they exert a very favorable action upon hair and skin.

The following are a few of the exceedingly large number of uses to which said products may be applied:

1. Carpet yarn is washed with a solution of one of said products containing two grams to the liter and prepared from a leather disintegrating liquor and oleic chloride.

2. Bobbins are dyed in an equalizing bath which contains as an equalizing medium one gram to the liter of a product prepared from commercial sodium lysalbinate and palmitic chloride.

3. From the condensation product of the alkaline disintegrating treatment of chrome leather shavings and oleic chloride, an oil is prepared which contains 30% of fat and this is mixed with 5% of vaseline oil and 5% of claw or hoof oil. By means of this mixture emulsions are obtained for use in the treatment of furs, skins and leather, said emulsions being stable in water and in the presence of chromium.

4. Unboiled cotton is mercerized with a cold, concentrated solution of caustic soda to which 2 to 5 grams per liter of one of said products are added for use as a moistening or sprinkling medium, said product having been obtained by the acid disintegrating treatment of albumin and concentrated with palmitic and stearic chloride in the presence of caustic potash and caustic soda solution.

It is to be understood that the foregoing description is to be considered in all respects as illustrative and not restrictive, reference being had to the appended claims rather than to said description to indicate the scope of the invention.

I claim:—

1. Method of making products of lathering and dispersing capacity which comprises causing higher fatty acid chlorides chemically to react with high molecular split-off products of albumin of the type of lysalbinic and protalbinic acid in alkaline solution.

2. Method of making products of lathering and dispersing capacity which comprises causing higher saturated fatty acid chlorides chemically to react with high molecular split-off products of albumin of the type of lysalbinic and protalbinic acid in alkaline solution.

3. Method of making products of lathering and dispersing capacity which comprises causing higher unsaturated fatty acid chlorides chemically to react with high molecular split-off products of albumin of the type of lysalbinic and protalbinic acid in alkaline solution.

4. Method of making products of lathering and dispersing capacity which comprises treating about 80 parts of lysalbinic acid with about 30 parts of oleic chloride in constantly alkaline solution of about 400 parts of water, and heating the reaction product thus obtained to about 60° C.

5. Method of making products of lathering and dispersing capacity which comprises treating about 27 parts of a constantly alkaline liquor obtained by the disintegrating treatment of leather waste, and having a content of about 50 per cent lysalbinic and protalbinic acids; with about 9 parts of oleic chloride; and allowing the reaction product thus obtained to stand at room temperature.

6. Method of making products of lathering and dispersing capacity which comprises mixing about 27 parts of the liquid obtained by the acid disintegrating treatment of leather waste with about 6 parts of oleic chloride and acid chlorides of solid fatty acids and about 4 parts of a caustic soda solution containing about 32.5% of caustic soda; allowing the reaction product thus obtained to stand at room temperature; and drying the oily product thus obtained to a powder.

7. Method of making products of lathering and dispersing capacity which comprises stirring about 81 parts of a constantly alkaline liquor obtained by an alkaline disintegrating treatment of chrome leather waste, with about 18 parts of chloride of palmitic and stearic fatty acids; and allowing the product of the resultant chemical reaction to stand for about 4 hours.

8. A washing, lathering, permeating and protective substance comprising the products of the chemical reaction of high molecular split-off products of albumin of the type of lysalbinic and protalbinic acid with higher fatty acid chlorides.

9. A washing, lathering, permeating and protective substance comprising the products of the chemical reaction of high molecular split-off products of albumin of the type of lysalbinic and protalbinic acid, with higher saturated fatty acid chlorides.

10. A washing, lathering, permeating and protective substance comprising the products of the chemical reaction of high molecular split-off products of albumin of the type of lysalbinic and protalbinic acid, with higher unsaturated fatty acid chlorides.

FRITZ SOMMER.